United States Patent [19]

Homma et al.

[11] Patent Number: 4,906,893

[45] Date of Patent: Mar. 6, 1990

[54] X-RAY IMAGE INTENSIFIER AND METHOD OF MANUFACTURING THE SAME

[75] Inventors: Katsuhisa Homma, Kawasaki; Sakae Kimura, Tokyo; Masaru Nikaido, Miura; Yoshiaki Ouchi, Yokohama; Yoshiharu Obata; Yoshikazu Uemura, both of Ootawara; Syozo Sato, Sagamihara, all of Japan

[73] Assignee: Kabushiki Kaisha Toshiba, Kawasaki, Japan

[21] Appl. No.: 286,865

[22] Filed: Dec. 20, 1988

[30] Foreign Application Priority Data

Dec. 25, 1987 [JP] Japan ................. 62-327512
Oct. 7, 1988 [JP] Japan ................. 63-251932

[51] Int. Cl.$^4$ .................. H01J 29/20; B05D 5/12
[52] U.S. Cl. ...................... 313/525; 313/467; 250/486.1; 427/64; 427/68
[58] Field of Search ............ 313/525, 467, 469; 427/64, 68, 69; 250/486.1; 252/301.6 S

[56] References Cited

U.S. PATENT DOCUMENTS

| 2,435,436 | 2/1948 | Fonda | 313/467 |
| 3,984,587 | 10/1976 | Lipp | 313/467 X |
| 4,140,940 | 2/1979 | Uehara et al. | 313/467 |

FOREIGN PATENT DOCUMENTS 47-38683 12/1972 Japan.
53-10958 1/1978 Japan.

Primary Examiner—Donald J. Yusko
Assistant Examiner—Sandra L. O'Shea
Attorney, Agent, or Firm—Cushman, Darby & Cushman

[57] ABSTRACT

An output phosphor film used in an output screen of an image intensifier is made of ZnS or (Zn, Cd)S host material and at least one activator element selected from the group consisting of Cu, Ag, Au, Al, and Cl. The phosphor film is formed on a face plate by means of chemical vapor-deposition, or physical vapor deposition in an inert-gas atmosphere having a pressure of 1 Pa or more, and is heat-treated. The formed phosphor film has hexagonal (Wurtzite-type) crystal and/or cubic (sphalerite-type) crystal structure. These crystals are orientated such that the (002) planes of the hexagonal crystals and/or the (111) planes of the cubic crystals are substantially parallel to the face plate.

17 Claims, 4 Drawing Sheets

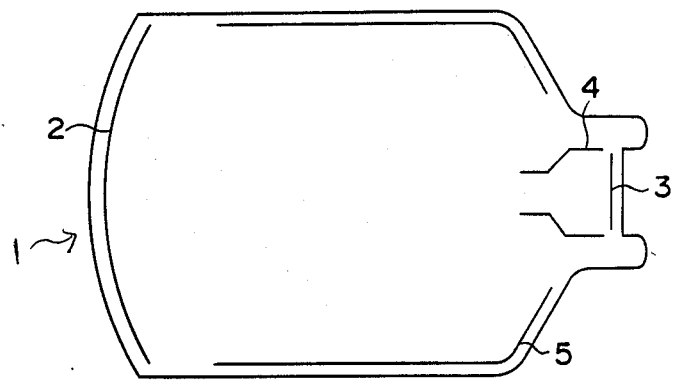
F I G. 1
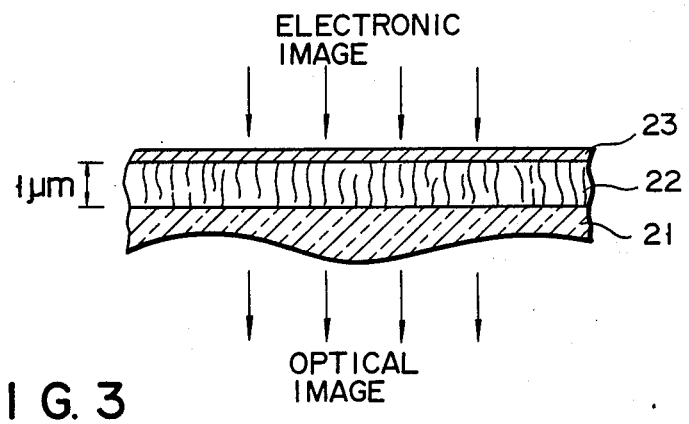
F I G. 3

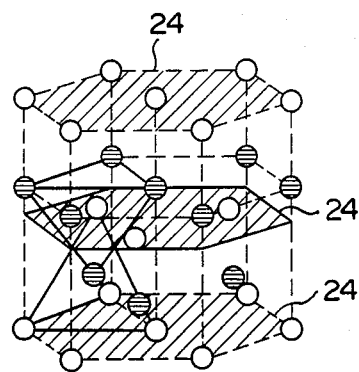
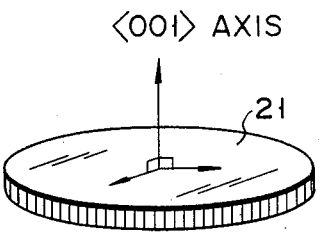
○ Zn OR Cd
⊖ S
⟨001⟩ AXIS
F I G. 4A        F I G. 4B
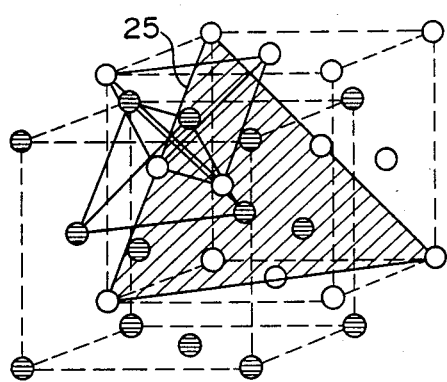
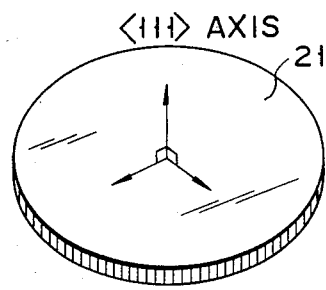
○ Zn OR Cd
⊖ S
⟨111⟩ AXIS
F I G. 5A        F I G. 5B

X-RAY IMAGE INTENSIFIER AND METHOD OF MANUFACTURING THE SAME

BACKGROUND OF THE INVENTION

1. Field of the Invention

The present invention relates to an X-ray image intensifier and a method of manufacturing the same, and more particularly to an improvement of the output phosphor film formed in the output screen of the image intensifier.

2. Description of the Related Art

As is shown in FIG. 1, an X-ray image intensifier generally comprises vacuum envelope 1, input screen 2 located near the input end of envelope 1, and output screen 3 located near the output end of envelope 1. Anode 4 and focusing electrode 5, both being hollow cylinders, are provided within envelope 1. Anode is located near output screen 3, and focusing electrode 5 extends between places 2 and 3, with its circumferential surface extending parallel to the inner surface of envelope 1.

Output plate 3 has such a structure as is shown in FIG. 2. Output phosphor film 12 is formed on face plate 11, and aluminum layer 13 is formed on output phosphor film 12. Output screen 3 is positioned in vacuum envelope 1 such that face plate 11 facing outward.

Output screen 3 is conventionally made by the following steps:

(1) (Zn, Cd) S:Ag phosphor having a particle size of 1 to 3 $\mu$m is coated on face plate 11 by a slurry coating technique, etc., thus forming phosphor film 12 having a thickness of 5 to 10 $\mu$m.
(2) A nitrocellulose coating is formed on phosphor film 12.
(3) A first aluminum layer having a thickness of about 1000 Å is formed on the nitrocellulose coating, by means of vapor-deposition method or the like.
(4) Face plate 11 is heated, thereby decomposing the nitrocellulose coating. The decomposed nitrocellulose evaporates through pores of the first aluminum layer.
(5) A second aluminum layer having a thickness of 2000 to 3000 Å is formed on the first aluminum layer. The first and second aluminum layer collectively constitutes aluminum layer 13.

Layer 13, which is a component of output screen 3, performs the following functions:

(1) To reflect, among the rays emitted from the phosphor in various directions, those rays which are emitted from the phosphor toward an electron beam source, thereby enhancing luminance.
(2) To prevent output phosphor film 12 from being charged electrically.
(3) To protect output phosphor film 12 from the alkali atmosphere within envelope 1, e.g., sodium atmosphere.

To perform all these functions, aluminum layer 13 must be about 4000 to 5000 Å thick. Layer 13 is formed by the separate of two steps, as has been mentioned above, for the following reason. The phosphor forming film 12 has a particle size of about 1 to 3 $\mu$m. Due to this relatively large particle size, gaps among the phosphor particles are formed which are greater than the deposit aluminum particles forming layer 13. Hence, when aluminum layer 13 vapor-deposited directly on output phosphor film 12, the aluminum particles are mixed into film 12. To prevent them from mixing into film 12, nitrocellulose is coated on output phosphor film 12. Here arises a problem. When aluminum is deposited at once on the nitrocellulose coating, thus forming layer 13 to a thickness of about 4000 to 5000 Å, the layer 13 has pores too small to allow the passage of the thermally decomposed nitrocellulose. Thus, two aluminum layers are formed, one after the other, to form layer 13.

In short, the conventional method of making the output screen 3 of an X-ray image intensifier has a drawback. It must involue a step of forming a nitrocellulose coating, a step of removing the coating, and various steps which must be performed to help successfully form and remove this coating. These steps renders the method complex.

In general, characteristics of an output screen for use in an X-ray image intensifier can be expressed by cathode-luminescence brightness, resolution, contrast, granularity, degree of after glow, and the like. Of these characteristics, a strong demand exists on the improvement of granularity since it greatly influences resolution and structure noise. However, it is difficult with the conventional method to manufacture an output screen having improved granularity. This is because it is impossible to reduce the average particle size of the phosphor, which is to be coated on face plate 11, to less than 1-3 $\mu$m. In other words, the structure of the phosphor layer formed on plate 11 cannot be further improved. With the existing technology it is almost impossible to produce a phosphor screen which exhibits a better granuality or a higher resolution.

Japanese Patent Disclosure No. 47-38683 discloses a method of forming a thin phosphor film made of manganese activated zinc silicate. This method is designed to improve both the granuality and the resolution of an output screen for use in an X-ray image intensifier. In this method, powder of a mixture of zinc fluoride and manganese or manganese compound is vapor-deposited on a quartz glass substrate. The deposit is baked at 1000° to 1200° C. in an air atmosphere, thereby forming an output film made of $Zn_2SiO_4$:Mn phosphor.

The inventors hereof made output phosphor films by the method disclosed in Japanese Patent Disclosure No. 47-38683. A beam current was applied to these films at the density of 0.01 $\mu$A/cm$^2$, under accelerating voltage of 30 kV, and the cathode-luminescence brightness of each film was measured. The average brightness of these films was 10 to 20 cd/m$^2$. This value is considered not sufficient to guarantee a practical use of the films in X-ray image intensifiers, for two reasons. First, an output efficiency of fluorescence in the thin phosphor film is low as compared with a film made of granular phosphor. Secondly, the luminous efficiency of the $Zn_2SiO_4$:Mn phosphor is only 6 to 8%. A film of this phosphor can hardly exhibit a practically adequate luminous efficiency if made thin.

SUMMARY OF THE INVENTION

It is an object of the present invention to provide an X-ray image intensifier having an output screen provided with an output phosphor film which has excellent characteristics, particularly excellent resolution, granularity and luminance.

According to the invention, there is provided an X-ray image intensifier provided with an output screen which comprises a face plate and an output phosphor film formed on the face plate. The phosphor film is made of a phosphor comprising a ZnS or (Zn, Cd)S host material and at least one activator element selected from the group consisting of Cu, Ag, Au, Al, and Cl. The phosphor has hexagonal (wurtzite-type) crystal and/or cubic (sphalerite-type) crystal structure. These crystals are orientated such that the (002) planes of the hexagonal crystals and/or the (111) planes of the cubic crystals are substantially parallel to a surface of the face plate.

Another object of this invention is to provide a method of manufacturing an X-ray image intensifier. In this method, phosphor film, which is made of a phosphor comprising a ZnS or (Zn, Cd)S host material and at least one activator element selected from the group consisting of Cu, Ag, Au, Al, and Cl, is formed on a face plate by means of chemical vapor deposition, or by means of physical vapor-deposition in an inert-gas atmosphere having a pressure of 1 Pa or more, and is then heat-treated, thereby forming a phosphor screen.

The output phosphor film made by the conventional method, that is, made by coating, on a face plate, phosphor powder having an average particle size of 1 to 3 $\mu$m, has sufficient luminance, but has neither adequate granularity nor sufficient resolution. One the other hand, the output phosphor film, which has been made by vapor-depositing $Zn_2SiO_4$ on a substrate, exhibits sufficient granularity and resolution, but has no practically sufficient luminance.

According to this invention, as has been described, a phosphor comprising ZnS or (Zn, Cd)S used as host material and at least one activator element selected from the group consisting of Cu, Ag, Au, Al, and Cl is deposited by means of chemical vapor deposition, or by means of physical vapor-deposition in an inert-gas atmosphere having a pressure of 1 Pa or more, and is then heat-treated. This output phosphor film has improved granularity, resolution, and luminance. The film has hexagonal (wurtzite-type) crystal and/or cubic (sphalerite-type) crystal structures, which are orientated such that the (002) planes of the hexagonal crystals or/and the (111) planes of the cubic crystals are substantially parallel to the surface of the face plate. These crystals are generally columnar. The output phosphor film is dense, and has good granuality. Hence, it serves to raise the use efficiency of the energy of the electron beams applied to the film, and its luminous efficiency increases. Since the interfaces between the crystals extend substantially normal to the face plate, the probability of electron scattering at the interfaces is low, whereby the output phosphor film has a sufficient resolution.

BRIEF DESCRIPTION OF THE DRAWINGS

FIG. 1 is a cross-sectional view showing a general structure of an X-ray image intensifier;

FIG. 3 is a cross-sectional view showing the output screen incorporated in an X-ray image intensifier according to the present invention;

FIG. 4A is a diagram schematically representing the (002) plane of a wurtzite-type crystal;

FIG. 4B is a diagram schematically illustrating how the <111> axis (i.e., C axis) of the wurtzite-type crystal extends with respect to the substrate;

FIG. 5A is a diagram schematically representing the (002) plane of a sphalerite-type crystal;

FIG. 5B is a diagram schematically illustrating how the <111> axis of the sphalerite-type crystal extends with respect to the substrate;

DETAILED DESCRIPTION OF THE PREFERRED EMBODIMENTS

Figure 2:
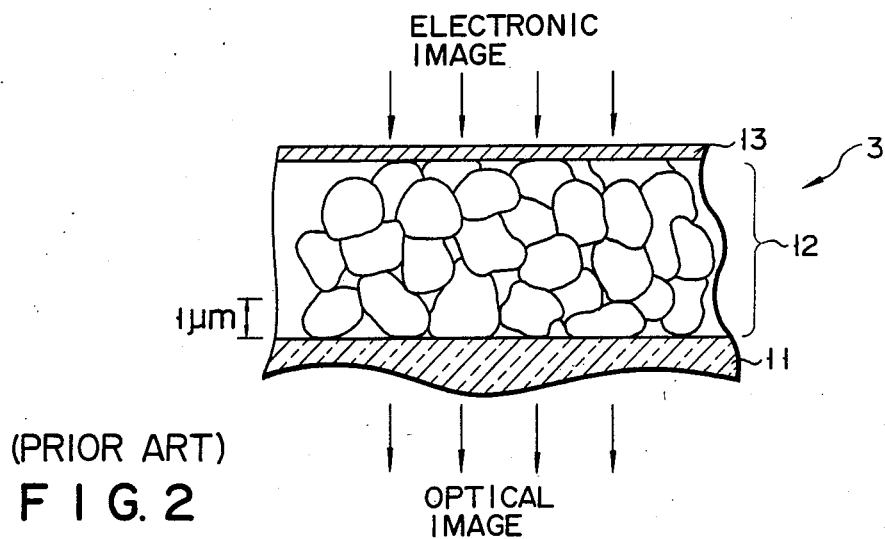
FIG. 2 is a cross-sectional view of the output screen made by the conventional method.

The inventors hereof studied the possibility of employing thin-film techniques which can provide phosphor film having excellent granularity, to form phosphor film which has high resolution and low structural noise. They thought it impossible with slurry-coating, precipitation, or electrodepositon to form, on a face plate (substrate), phosphor film which is further thinner and has better granularity than the phosphor film made by the existing method. Therefore, they decided to employ the thin-film techniques, a typical example of which is vapor deposition.

Generally, when the phosphor screen has a thin film structure, the brightness decreases. Hence, the inventors also studied to preserve the desired brightness by using phosphor having great luminous efficiency even if employed a thin film structure. They decided to use ZnS or (Zn, Cd)S phosphor since either phosphor appear to exhibit luminous efficiency of 20% or more. The term "luminous efficiency" means the ratio of the luminous energy to the incident energy. At least one activator, selected from the group consisting of Cu, Ag, Au, Al, and Cl was added to the phosphor. As is known in the art, Cl can be substituted for S, and Cu, Ag, Au, and Al can be substituted for Zn or Cd. In this case, the Al or Cl atom forms a donor-type impurity level, and the Cu, Ag or Au atom forms an acceptor-type impurity level, in accordance with the difference its valence and that the atom substituted by it. Hence, Al, Cl, Cu, Ag, or Au atom contributes to fluorescence.

Further, the inventors discussed various method which can form phosphor films having fine crystallinity, and in which an activator is uniformly dispersed in the host material, thereby to form emission center efficiently. Of these methods, one that seems preferable is to deposite host material layers and activator layers, alternately one upon another, thus dispersing the activator effectively in the host material, and then the resultant multi-layer structure is heat-treated to activate the film thus activating it. The vapor deposition of the host material and the activator materials is carried out in an inert-gas atmosphere, thereby to prevent the host material and the activator from decomposing and undergoing selective evaporation. This specific method can produce phosphor films excellent in both stoichiometry and crystallinity.

One embodiment of the present invention, i.e., an X-ray image intensifier, will now be described in detail, with reference to the accompanying drawings. The X-ray image intensifier according to the invention is substantially identical, in general structure, to the X-ray image intensifier illustrated in FIG. 1.

As is shown in FIG. 3, the output screen of the X-ray image intensifier of this invention comprises heat-resistant face plate 21, output phosphor film 22 formed on face plate 21, and aluminum layer 23 formed on phosphor film 22.

Face plate 21 may be made of material which has a softening point of 500° C. or more and, hence, does not warped while output phosphor film 22 is being heat-treated, and which allows the transmission of light having a wavelength ranging from 450 nm to 600 nm. More specifically, plate 21 may be made of quartz, sapphire, siallon, heat-resistant glass, or the like.

Output phosphor film 22 is made of phosphor which comprises at least one host material selected from the group consisting of ZnS and (Zn, Cd)S, and at least one activator element selected from the group consisting of Cu, Ag, Au, Al, and Cl. The concentration of the activator element, based on the amount of the host material, greatly influences the brightness of the phosphor, and is about 0.001 to 5 mol%, preferably 0.01 mol% to 1 mol%. When (Zn, Cd)S is used as host material, it is desirable that the ratio of Cd atoms to Zn be 4 or less.

The phosphor which constitutes output phosphor film 22 has hexagonal crystal (wurtzite-type crystal) structure shown in FIG. 4A, and/or cubic crystal (sphalerite-type crystal) structure shown in FIG. 5A. The (002) planes 24 of the hexagonal crystal, and/or the (111) plane 25 of the cubic crystal is substantially parallel to a surface of face plate 21. Further, as is evident from FIG. 4B, the hexagonal crystal is columnar, extending in $<001>$ axis from the surface of face plate 21. As can be seen from FIG. 5B, the cubic crystal is also columnar, extending in the $<111>$ axis from the surface of face plate 21.

Figure 6C:
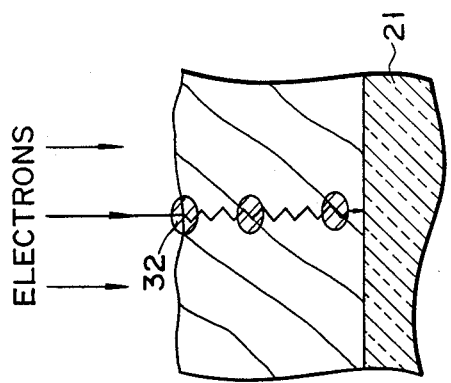
FIG. 6C is a cross-sectional view schematically illustrating another conventional output screen.
Figure 6B:
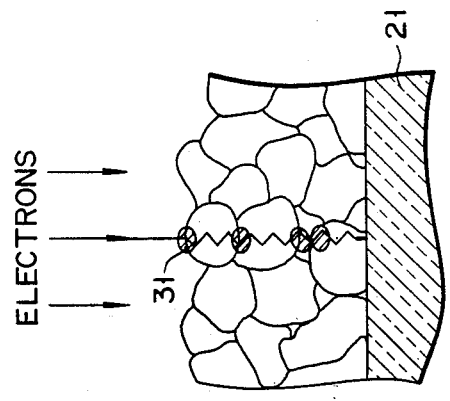
FIG. 6B is a cross-sectional view schematically showing a conventional output screen.
Figure 6A:
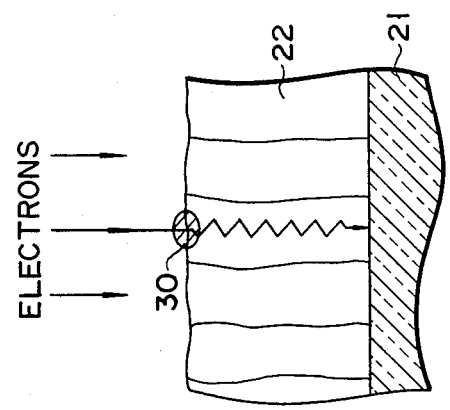
FIG. 6A is a cross-sectional view schematically illustrating the output screen of the X-ray image intensifier shown in FIG. 3.

FIG. 6A is a schematic cross-section of the output screen of this invention. As is clearly shown in FIG. 6A, film 22 is constituted by columnar crystals of the phosphor, all extending at substantially right angle to face plate 21. Each electron incident perpendicularly on the output screen passes through the same columnar crystal of the phosphor after it had passed the non-emission part (dead layer), i.e., the top surface region of film 22 in this case. Few electrons move along or through the interface between adjacent crystals, which is also a non-emission region. Hence, the output screen of the present invention uses the energy of the electrons very efficiently.

Where film 22 is constituted by phosphor crystals whose axes extend in different directions, i.e., granular phosphor as is illustrated in FIG. 6B, or whose crystal planes are not parallel to face plate 21 as is shown in FIG. 6C, each electron incident on the output screen would, in all probability, pass through several non-emission regions 31, 32 (i.e., the interfaces between the adjacent crystals) In the case of the output phosphor film shown in FIG. 6B or 6C, the energy of the electrons incident on the output plate is most likely wasted.

Preferably, the thickness of output phosphor film 22 is 3000 Å to 8 $\mu$m, in accordance with the accelerating voltage applied to electron beams and also with the thickness of aluminum layer 23 (i.e., the metal back). If film 22 is thinner than 3000 Å, the electron beams may pass through the film 22, thus lowering luminous efficiency. If film 22 is thicker than 8 $\mu$m, the distance between face plate 21 and the emission region of film 22 is too long. In this case, the fluorescence is attenuated greatly, and film 21 has an insufficient luminous efficiency. When accelerating voltage of about 30 kV is employed in the X-ray image intensifier, it is preferable that the output screen have a phosphor film having a thickness of 1 $\mu$m to 3 $\mu$m.

The output screen described above is manufactured by the following method. First, output phosphor film 22 which comprises at least one host material selected from the group consisting of ZnS and (Zn, Cd)S, and at least one activator element selected from the group consisting of Cu, Ag, Au, Al, and Cl is formed by means of chemical deposition, or by means of physical deposition in an inert-gas atmosphere having a gas pressure of 1 Pa or more. Thereafter, this phosphor film is heat-treated.

The physical deposition, which can be employed in this present invention, is resistance heating vapor deposition, electron beam heating vapor deposition, laser heating vapor deposition, or sputtering. One of these methods can be performed by coevaporation, multi-source evaporation, or multi layer evaporation. The gas pressure of the inert-gas atmosphere, in which the physical deposition is carried out, depends on the inert-gas employed; preferably, it is 10 to 100 Pa.

The chemical deposition, which can be used in the present invention is chemical vapor-deposition (CVD), metal organic chemical vapor-deposition (MOCVD), atomic layer epitaxy (ALE), molecular layer epitaxy (MLE), or the like. Any of these chemical deposition methods can form phosphor films having sufficient crystallinity.

The physical deposition is effected in the inert gas atmosphere in order to form a phosphor film having a great fluorescent brightness. During the physical deposition, the evaporating phosphor particles have a short mean free path and collide one another very frequently, thereby preventing zinc atoms, sulfur atoms, or the like, from undergoing selective evaporation to be singly on face plate 21. Therefore, the probability of depositing a compound such as ZnS on face plate 21 can increase. The more free atoms present in the phosphor film, the more singular points existing in the crystal structure. And, the more singular points in the crystal structure, the less the fluorescent of the phosphor film. The output screen having a phosphor film, which has been formed by resistance heating vapor deposition, electron beam heating vapor deposition or laser heating vapor deposition in an inert-gas atmosphere of a gas pressure of 1 Pa or more, has cathode-luminescence brightness which is practically sufficient. To perform electron beam heating vapor deposition successfully, a deposition apparatus employing differential exhausting system is used to maintain high vacuum only in the vicinity of the electron gun of the apparatus.

It is desirable that the host material and the activator be deposited using separate deposition sources during the physical deposition. ZnS, CdS, or (Zn, Cd)S can be used as the source of the host material. CuCl, AgCl, Cu, CuCl$_2$, Ag, Cu-Al, or the like can be used as the source of the activator. The phosphor emanate specific fluorescence, in accordance with the activators. A flux, such as NaCl, KCl, MgC0$_3$, or the like, can be deposited with host and activator material which can disperse the activator more uniformly in the host material during the heat-treatment. NaCl and KCl serves not only as a flux but also as a source of Cl (i.e., the activator element).

The temperature and time for the heat treatment of output phosphor film 22 are determined in accordance with the host material selected and also with the activator selected. Preferably, the temperature is 500° C. to 1100° C. More particularly, when the host material contains CdS, the temperature may be 600° C. to 800° C. in order not to prevent CdS from evaporating. When the host material consists of only ZnS, the temperature may fall within the range of 700° C. to 900° C. If the temperature is too low, the activator will neither be dispersed in the host material, nor substituted by the atoms of the host material, and will thus fail to perform its function. On the other hand, if the temperature is too high, many problem such as the exfoliation of the deposited film, the re-evaporation of its components, the defects of the film, and the inclusion of impurities, are caused.

It is possible to heat-treat output phosphor film 22 in vacuum, an inert-gas atmosphere, or a reducing-gas atmosphere. Nonetheless, it is preferable that the heat treatment be conducted in an Ar atmosphere or a $N_2$ atmosphere since Ar and $N_2$ gases are easy to manipulate. It is advisable to use $H_2$ gas containing $H_2S$ gas in order to prevent the host material, i.e., ZnS or (Zn, Cd)S, from decomposing to evaporate during the heat treatment. In this case, it suffices that the content of $H_2S$ gas is about 1%.

Output phosphor film 22 is dense. In other words, the columnar crystals forming film 22 are densely packed, contacting one another. Therefore, aluminum layer 23 can be vapor-deposited directly on film 22, in a single step to a desired thickness (e.g., about 4000 to 5000 Å).

A few examples of output phosphor films according to the invention will now be described.

EXAMPLE 1

Resistance-heating vapor deposition was employed as physical deposition, and carried out in the following way, in an Ar atmosphere having pressure of about 40 Pa.

A transparent quartz disk plate having a diameter of 40 mm and a thickness of 1.0 mm, with both surfaces optically polished, was used as a heat-resistant face plate. This quartz disk used as the substrate was left to stand at 220° C. Three vapor deposition sources were used, i.e., three crucibles containing 2.0 g of ZnS, 1.4 g of Cd, and 3.0 mg of Ag, respectively.

The quartz disk was set on a support within the vacuum chamber of a vapor-deposition apparatus. The support was rotated at about 60 rpm, so that the quartz disk passed over the three crucibles, whereby ZnS, CdS, and Ag were vapor-deposited for one second, thus forming a ZnS layer, a CdS layer, and an Ag layer on the disk, one upon another. The relationship between the temperature of each crucible and the speed of depositing the content of the crucible had been predetermined. The crucibles were heated to the temperatures controlled in accordance with this relationship, such that the deposition speed ratio among ZnS, CdS, and Ag were, in mol ratio, 2:1:0.003. The vapor deposition was performed for about 2 hours, thereby forming an output phosphor film 22 having a thickness of 1.5 μm on the face plate 21. When examined by an SEM, the phosphor film was found to have projections and depressions, each being less than 1000 Å high and deep, to consist of columnar crystals growing in the direction to the resistant-face plate 21.

Figure 7:
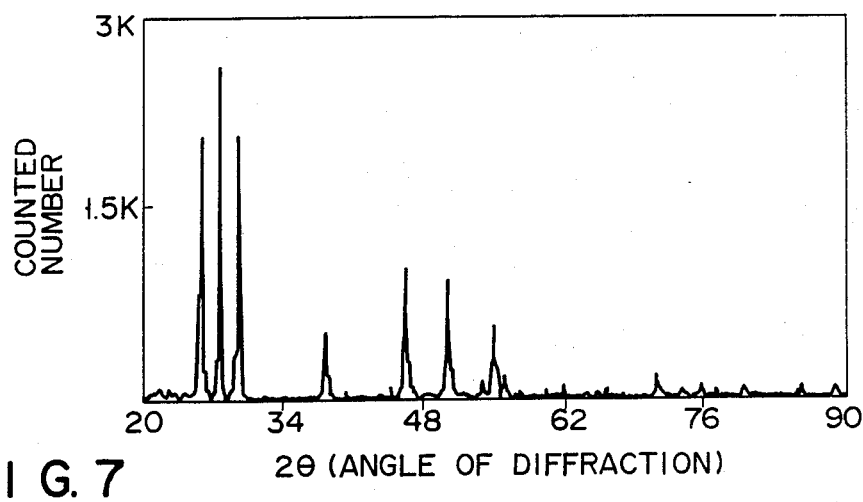
FIG. 7 is a graph representing the relationship between the counted number of X-ray diffraction patterns and the diffraction angle.
Figure 8:
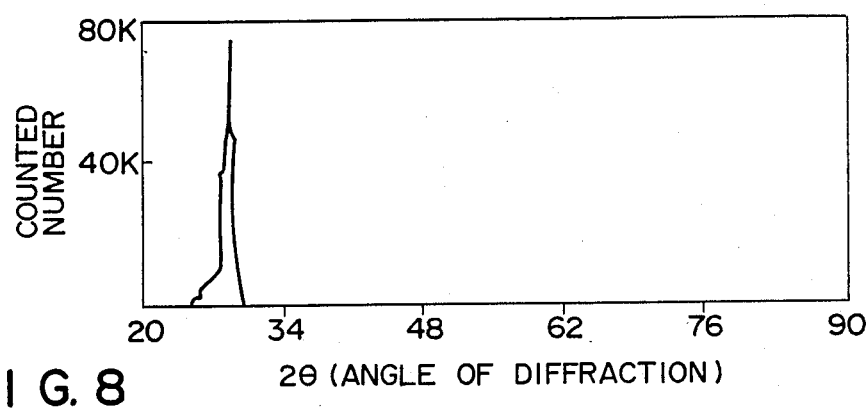
FIG. 8 is a diagram showing the X-ray diffraction pattern recorded of an output screen forming (Zn, Cd)S;Ag phosphor film according to the present invention.

The output phosphor film made by the conventional method, i.e., the slurry coating, and the phosphor film made by the method described above were subjected to X-ray diffraction by using a X-ray diffractometer. As is shown in FIG. 7, the diffraction pattern of the film made by the slurry coating had a number of diffraction peaks. By contrast, the pattern of the film according to the invention had one main diffraction peak and a few low peaks as is shown in FIG. 8,. The analysis showed that the main peak had resulted from the (002) plane of the hexagonal (wurtzite-type) crystal or the 111) plane of the cubic (sphalerite-type) crystal. It was difficult to determine which compound, ZnS or CdS, was responsible for the main peak. This is because the ZnS crystal and the CdS crystal have their main peak at substantially the same angle of diffraction, whether they are hexagonal or cubic. The lattice spacing of each crystal was nearly equal to the value obtained by weighted-averaging, at the ratio of 2:1, the lattice spacing of the ZnS crystal and that of the CdS crystal. The diffraction peaks of the phosphor film were sharp, proving that the film had good crystallinity. The X-ray diffraction analysis showed that the (002) plane of the hexagonal (wurtzite-type) crystal or the (111) plane of the cubic crystal (sphalerite-type crystal) was substantially parallel to the surface of the quartz disk (i.e., the substrate).

The output phosphor film was heat-treated at 700° C. for 3 hours in an Ar atmosphere. The temperature of the Ar atmosphere was raised for two hours and then lowered also for two hours, in accordance with the control program prepared for a heat-treatment furnace.

EXAMPLE 2

Figure 9:
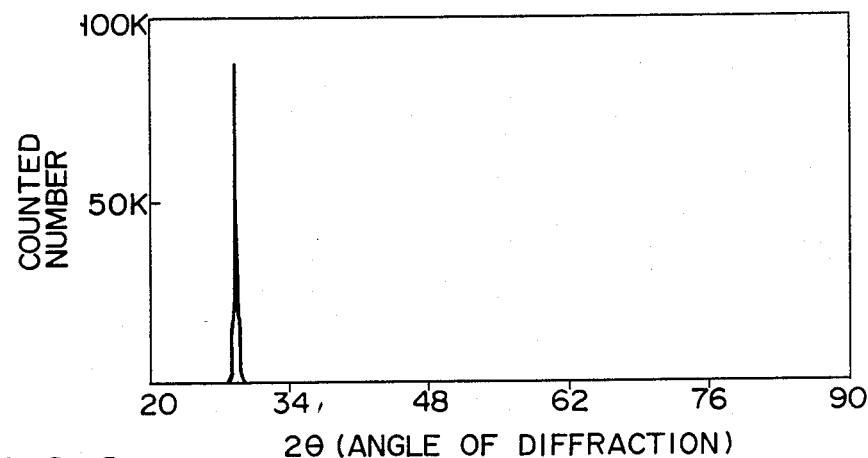
FIG. 9 is a diagram representing the X-ray diffraction pattern recorded of another output screen forming ZnS;Cu,Cl phosphor film according to the present invention.

An output phosphor film was formed of a phosphor comprising ZnS used as the host material, and Cu and Cl used as activator elements, under substantially the same conditions as in Example 1, except that the activator elements (Cu and Cl) were used in mol ratio of 1/1000 to the host material (ZnS). The phosphor film, thus formed, was heat-treated. This phosphor film was subjected to X-ray diffraction analysis. The results of the analysis was as is shown in FIG. 9. As is evident from this figure, the main peak of the diffraction pattern had resulted from either the (002) plane of the hexagonal crystal or the (111) plane of the cubic crystal. Besides the main peak, few low peaks, each having 1% or less of the intensity of the main peak, appeared in the diffraction pattern. The main peak was sharp, proving that the phosphor film had good crystallinity. Thus, it was ascertained that the (002) plane of the hexagonal (wurtzite-type) crystal or the (111) plane of the cubic (sphalerite-type) crystal was orientated parallel to the quartz disk (i.e., the substrate). The physical deposition carried out in the inert-gas atmosphere is considered to have suppressed selective evaporation of ZnS, CdS, and Ag, and helped to form a phosphor film having good stoichiometry.

The output phosphor film was heat-treated at 800° C. for 3 hours in an Ar atmosphere. The temperature of the Ar atmosphere was raised for 2 hours, and was lowered for 2 hours.

The two types of phosphor films, i.e., Example 1 and Example 2, were subjected to TEM and electron-beam diffraction, both before and after the heat-treatment. The film before the heat-treatment consisted of small crystals having a diameter of hundreds of angstroms, and the film after the heat-treatment consisted of large columnar crystals having a diameter of thousands of angstroms. The electron-beam diffraction pattern of each crystal, either before and after the heat-treatment, revealed that each crystal consists of both types of crystals, i.e., hexagonal (wurtzite-type) crystal and cubic (sphalerite-type) crystal.

The analysis of the electron-beam diffraction patterns suggests that the heat-treatment re-orientated the small crystals, thus forming large columnar crystals. The forming of large columnar crystals is interpreted to be one of the factors which enhanced the fluorescence brightness.

Thereafter, aluminum was vapor-deposited on the output phosphor films of Example 1 and Example 2, thus forming an aluminum layer, as a metal back, having a thickness of about 4000 Å, as is illustrated in FIG. 4. As a result, two types of output screens for use in X-ray image intensifier were made.

Further, aluminum was vapor-deposited on the conventional phosphor film made by slurry coating, and also on the manganese-activated zinc silicate film disclosed in Japanese Patent Disclosure No. 47-38683, thereby forming an aluminum layer having a thickness of about 4000 Å, as is illustrated in FIG. 4. Thus, two types of output screens of prior art were made.

Cathode rays were applied onto these four types of output screens at the density of 0.01 $\mu A/cm^2$, under accelerating voltage of 30 kV. The cathode-luminescence brightness, resolution, and structure noise of each output screen were evaluated. More precisely, the resolution of each screen was determined by using an optical microscope (magnification: 40 to 100) with reference to a resolution chart, and the structure noise was evaluated under the same optical microscope. The results were as is shown in Table 1.

TABLE 1

| | | Cathode-Luminescence brightness (cd/m$^2$) | Marginal Resolution (lp/mm) | Structure Noise |
|---|---|---|---|---|
| Prior Art | (Zn,Cd)S:Ag Slurry-coated | 110 | 90 | Brightness-nonuniformity rathe prominent |
| | Zn$_2$SiO$_4$:Mn Vapor-deposited | 20 | 120 | Brightness-nonuniformity not prominent |
| Examples | (Zn,Cd)S:Ag | 101 | 120 | Brightness-nonuniformity not prominent |
| | ZnS:Cu,Cl | 98 | 120 | Brightness-nonuniformity not prominent |

Test Condition

Electron accelerating voltage; 30 kV
Electron beam current density; 0.01 $\mu A/cm^2$ As may be understood from Table 1, both types of output screens according to the invention exhibited resolution as high as that of an output screen having a Zn$_2$SiO$_4$:Mn vapor-deposited film, and had brightness as great as that of an output screen having a (Zn,Cd)S:Ag slurry-coated film. In addition, either type of an output screen according to the invention had little structure noise.

EXAMPLE 3

Various types of output screens were manufactured in the same way as in Example 1 and Example 2, each screen having a film made of phosphor consisting of ZnS and CdS used in a different ratio, and an activator or activators, such as AgCl; Ag and Al; Ag and NaCl; Cu; CuCl$_2$, Cu, Ag and Au; Ag and BaCl, Ag and KCl; Ag and MgCO$_3$; or the like. These output screens exhibited properties similar to those of Examples 1 and 2. Preferably, the phosphor films of these output screen range from about 5000 A to 4 $\mu$m. If the screens are too thick or too thin, their cathode-luminescence brightness will be insufficient. If the screens are too thick, they will fails to have adequate resolution.

Two examples of chemical deposition methods according to the invention will be briefly described.

EXAMPLE 4

This example is an ALE method. ZnCl$_2$ gas and H$_2$S gas, used as Zn feed gas and S feed gas, are alternately introduced into the chamber of a CVD apparatus, thereby alternately forming single-atom layers of Zn and single-atom layers of S on a face plate located within the chamber and heated to 550° C. A ZnS layer is thereby formed on the face plate. Then, Cu and Cl, both used as activators, are vapor-deposited on the ZnS film, from the CuCl source located within the chamber. The ZnS film with Cu and Cl deposited on it is heat-treated in an Ar atmosphere, thereby diffusing the activators into the ZnS film, thus activating the ZnS film.

EXAMPLE 5

This example is an MOCVD method. A face plate set within the chamber of an MOCVD apparatus is heated 300° C. or more and maintained at this temperature. Dimethylzinc (DMZ), used as the Zn feed gas and diethyl sulfur (DES), used as the S feed gas, are introduced into the chamber, thereby forming a ZnS film on the face plate. Then, Cu and Cl are vapor-deposited on the ZnS film in the same way as in Example 4. The ZnS film is heat-treated in the same manner as in Example 4, thus forming an output phosphor film.

The output screens having the phosphor film of Example 4 or Example 5, which has been formed by a chemical deposition, exhibit sufficient brightness and adequate resolution.

The output screens of Examples 1 to 5 were incorporated into X-ray image intensifiers whose other components are of the known ones. These X-ray image intensifiers were tested for their operating characteristics. Their modulation transfer function (MTF) and their marginal resolution were better than those of the conventional X-ray image intensifiers which have a slurry-coated output screen. Further, their structure noise was less than that of the conventional X-ray image intensifiers. Their cathode-luminescence brightness was five times greater than that of the conventional X-ray image intensifiers. Because modulation transfer function (MTF) and marginal resolution were improved and structure noise was reduced, and enhanced chathode-luminescence brightness, each X-ray image intensifier according to the invention is quite practical.

As has been described above, the phosphor film of the output screen incorporated in the X-ray image intensifier according to this invention is thin film type, and therefore has high resolution, good granularity, and low level structure noise. Therefore, the X-ray image intensifier exhibits a cathode-luminescence brightness far greater than that of the conventional X-ray image intensifier and is practically useful.

What is claimed is:

1. An X-ray image intensifier provided with an output screen which comprises:
   (a) a face plate; and
   (b) an output phosphor film formed on the face plate and comprising at least one host material selected from the group consisting of ZnS and (Zn, Cd)S, and at least one activator element selected from the group consisting of Cu, Ag, Au, Al, and Cl, the output phosphor film having at least one of hexagonal (wurtzite-type) crystal and cubic (sphalerite-type) crystal structures, (002) planes of the hexagonal crystals and (111) planes of the cubic crystals being substantially parallel to surface of the face plate, respectively.

2. An X-ray image intensifier according to claim 1, wherein the host material is ZnS.

3. An X-ray image intensifier according to claim 1, wherein the host material is (Zn, Cd)S.

4. An X-ray image intensifier according to claim 3, wherein the mol ratio of Cd to Zn is 4 or less.

5. An X-ray image intensifier according to claim 1, wherein the output phosphor film has a thickness of 3000 Å to 8 μm.

6. An X-ray image intensifier according to claim 1, wherein the output screen further comprises a metal back layer formed on the output phosphor film.

7. An X-ray image intensifier according to claim 1, wherein the concentration of the activator is 0.001 to 5 mol% based on the amount of the host material.

8. An X-ray image intensifier provided with an output screen which comprises:
   (a) a face plate which is transparent to specific light;
   (b) an output phosphor film formed on the face plate and comprising densely packed columnar crystals of a phosphor including at least one host material selected from the group consisting of ZnS and (Zn, Cd)S, and at least one activator element selected from the group consisting of Cu, Ag, Au, Al, and Cl, the columnar crystals being at least one of hexagonal (wurtzite-type) crystal and cubic (sphalerite-type) crystal structures, and (002) planes of the hexagonal crystals and (111) planes of cubic crystals are substantially parallel to the face plate, respectively; and
   (c) a metal back layer formed on the output phosphor film.

9. A method of manufacturing an X-ray image intensifier comprising the steps of:
   (a) forming an output phosphor film on a face plate by means of a chemical vapor deposition or a physical vapor deposition in an inert-gas atmosphere having a gas pressure of 1 Pa or more, the output phosphor film comprising at least one host material selected from the group consisting of ZnS and (Zn, Cd)S, and at least one activator element selected from the group consisting of Cu, Ag, Au, Al, and Cl; and
   (b) heat-treating the output phosphor film.

10. The method according to claim 9, wherein the host material is ZnS.

11. The method according to claim 9, wherein the host material is (Zn, Cd)S.

12. The method according to claim 9, wherein the output phosphor film is formed by means of a physical vapor deposition.

13. The method according to claim 12, wherein separate sources of the host material and separate sources of the activator element are used in the physical vapor deposition.

14. The method according to claim 12, wherein the physical vapor deposition is resistance-heating vapor deposition.

15. The method according to claim 9, wherein the output phosphor film is formed by means of a chemical vapor deposition.

16. The method according to claim 9, wherein the output phosphor film is heat-treated at 500° to 1100° C.

17. The method according to claim 9, wherein the host material and the activator element are deposited alternately one upon another.

* * * * *